April 20, 1926.

E. CLEMENCE

PUSH BUTTON CONTROL SYSTEM

Filed Sept. 22, 1924    3 Sheets-Sheet 1

1,581,387

INVENTOR
Edward Clemence
BY HIS ATTORNEY
Levin H. Campbell

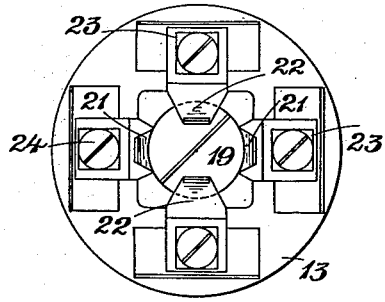
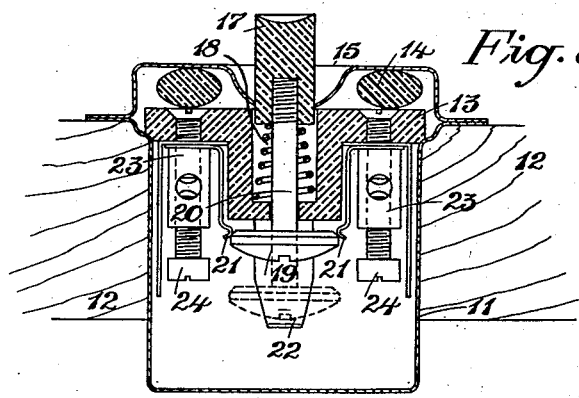
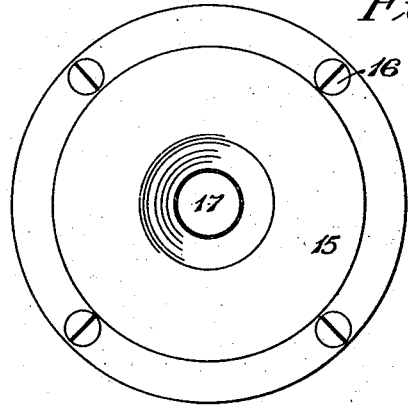

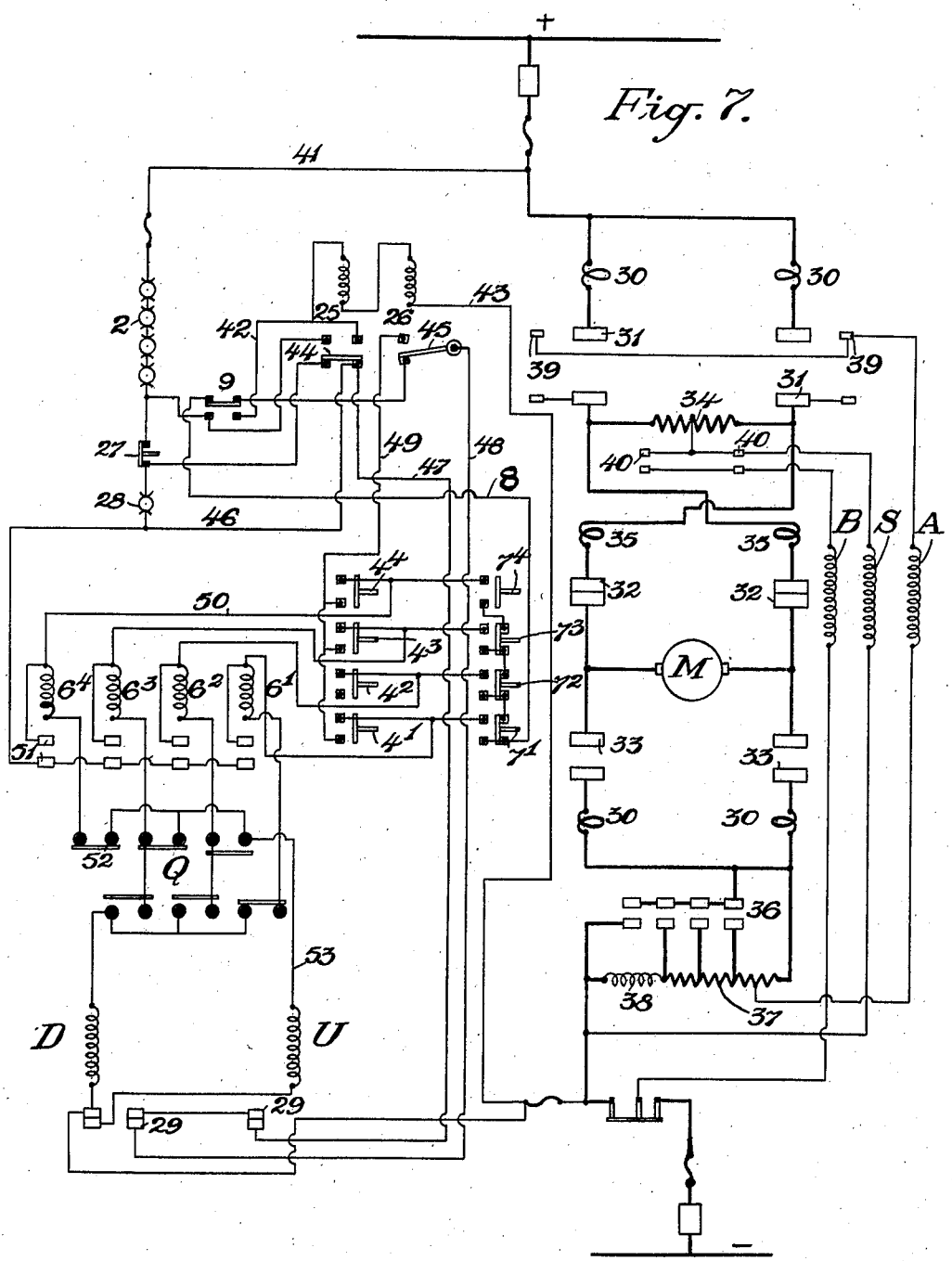

Patented Apr. 20, 1926.

1,581,387

UNITED STATES PATENT OFFICE.

EDWARD CLEMENCE, OF LONDON, ENGLAND, ASSIGNOR TO OTIS ELEVATOR COMPANY, OF NEW YORK, N. Y., A CORPORATION OF NEW JERSEY.

PUSH-BUTTON-CONTROL SYSTEM.

Application filed September 22, 1924. Serial No. 739,117.

*To all whom it may concern:*

Be it known that I, EDWARD CLEMENCE, a subject of the King of England, residing in London, England, have invented a new and useful Improvement in Push-Button-Control Systems, of which the following is a specification.

This invention relates to the remote control of electric motors and other apparatus by push-buttons, and is especially intended for use in the push-button control systems of electric lifts of the automatic type.

In such apparatus where two or more sets of push-buttons are provided for operating the lift or the like from different points, for example from the lift-car and from the several landings, interference between one set of pushes and another is usually obviated by a switch which interrupts the common line to the second set of pushes when one of the first set is actuated or when the lift-car is occupied. Since, however, the two sets of push-buttons are arranged in parallel branches of the controlling circuits, and the contacts of corresponding push-buttons of the two sets are connected together by their common connections to the windings of the floor magnets or equivalent apparatus, interference may still arise under certain conditions; for example, if a car push-button and the corresponding landing push be depressed simultaneously, a connection is established through the depressed landing push-button to one or more other landing pushes so that if another of these last-mentioned landing pushes is also at the same time depressed it will close its own particular circuit and may therefore obtain control of the lift, although the car is occupied and the ordinary noninterference switch is in the open position.

The present invention proposes to overcome this fault in the usual systems of push-button remote control, by the employment of push-buttons adapted to open one electrical circuit and to close another circuit, these push-buttons being so connected up that each of them when closing its own circuit opens the common line or circuit to certain other push-buttons, preferably to all the push-buttons beyond it in a pre-arranged order of position.

The push-buttons of one set may similarly be connected so as to ensure that if two or more of these pushes are pressed simultaneously only one can obtain the control, the order of connection being arranged so as to give preference to certain pushes as required.

Interference between two sets of pushes may be prevented and the preference given to either set, by providing make-and-break pushes for the preferred set and connecting them in such a way that each push of that set when depressed opens the circuit of the corresponding push-button of the other set, the latter push-button of the simple type being thereby rendered inoperative.

The invention is hereafter described with reference to the accompanying drawings, in which:—

Figure 1 shows a well known arrangement, while Fgures 2 and 3 illustrate two methods of applying the present invention thereto in order to overcome the fault mentioned above.

Figures 4, 5 and 6 represent a suitable construction of make-and-break push for carrying the invention into practice; Figure 4 is a rear view with the housing box removed, Figure 5 is a horizontal section, and Figure 6 a front elevation showing the cover.

Figure 7 represents the diagram of connections for an electric elevator with automatic push-button control arranged in accordance with one method of carrying out the present invention.

Figure 1:
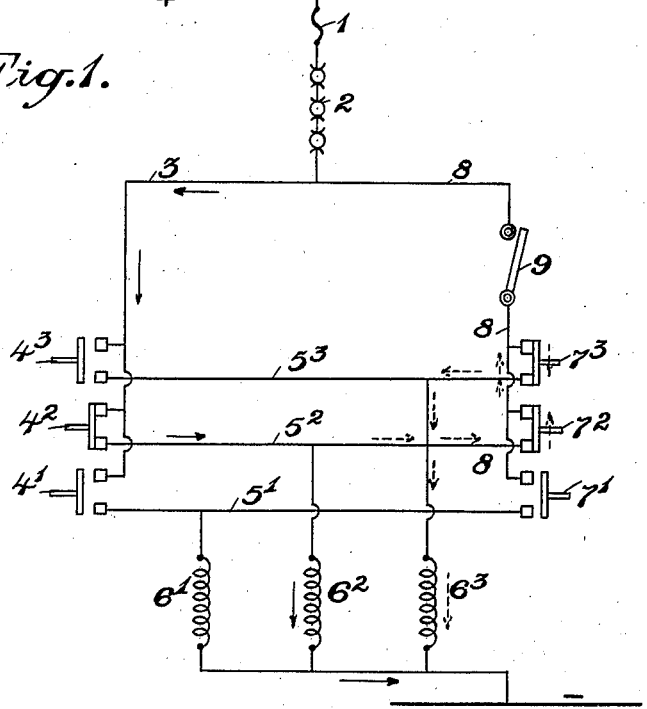
Figures 1, 2 and 3 are explanatory diagrams representing the control circuit in an automatic electric lift system.

Referring to Figure 1, the circuit by which the car push-buttons control the lift extends from the positive main through the usual main switch and fuse 1, gate locks 2 at the several landings, to a common line 3 having branches to the respective pushes $4^1$ $4^2$ $4^3$; the other contacts of these pushes are connected by the leads $5^1$ $5^2$ $5^3$ to the floor magnets $6^1$ $6^2$ $6^3$ which operate the up and down reversing switches of the lift by the usual means. The leads $5^1$ $5^2$ $5^3$ are also connected to the landing pushes $7^1$ $7^2$ $7^3$ at the respective floors, the other contacts of these landing pushes being connected by a common line 8 through a car floor switch 9 or other non-interference device to a junction point in the line 3.

In the position shown, the car push $4^2$ is pressed, allowing current to pass, as indicated by the arrows, to energize the second floor magnet $6^2$, in order to direct the car to that floor. The switch 9 being opened by the weight of the passenger in the car, the line 8 to the landing pushes will be interrupted; nevertheless if two of the landing pushes are pressed by persons desiring to call the car, a circuit will be established, as indicated by the dotted arrows, from the lead $5^2$, through the push $7^2$, along the common line 8 as far as the push $7^3$, through the closed contacts of the latter, to the lead $5^3$ to the floor magnet $6^3$. Consequently both the floor magnets $6^2$ and $6^3$ will operate, and in some cases the lift car will proceed to the third floor landing although the car is occupied by a passenger wishing to alight at the second floor.

Figure 2:
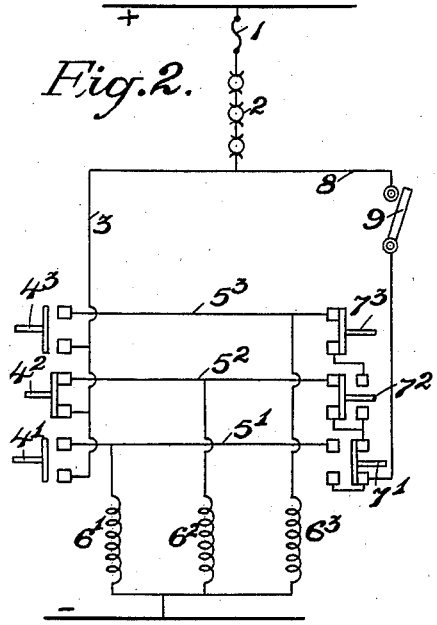

Figure 2 illustrates one method of arranging the push buttons in accordance with the present invention. As in the previous case, the control circuit extends through the safety devices 1, 2, to the junction point where it divides, one branch leading to the common line 3 of the several car pushes 4, which are of the ordinary type, having their other contacts connected to the respective floor magnets 6. The other branch 8 of the control circuit extends through the non-interference switch 9 to one contact of the push-button $7^1$ on the bottom landing; in the improved arrangement shown this push-button and that $7^2$ at the intermediate landing are of the make-and-break type, having four contacts, while the push-button $7^3$ at the top landing is of the simple type with two contacts normally open. The lead from the non-interference switch 9 is connected to one of the normally closed contacts (viz the right hand pair) of the bottom landing push $7^1$, and the other normally closed contact of this push-button is connected through the normally closed contacts (viz the right hand pair) of the intermediate push to one of the contacts of the top landing push-button.

One of the normally open contacts (viz the left hand pair) of each make-and-break push is connected to the normally closed contact of the same push on the side nearer to the non-interference switch; these permanently connected contacts are shown as the lower ones in each case. The other normally open contacts of all the landing pushes are connected in the usual way by the leads 5 to the respective floor magnets 6, in parallel to the corresponding car pushes 4.

With this arrangement, each landing push 7 before closing its own circuit opens those of all the landing pushes above it, thus preventing interference and giving a preference to the lower of two landing pushes pressed simultaneously.

The car push $4^2$ and the landing pushes $7^2$ $7^3$ are shown pressed, as in the previous case; it will be seen that the circuit to the floor magnet $6^2$ is closed as before, but the additional circuit through the two pushes $7^2$ $7^3$ is interrupted because the second landing push $7^2$ breaks the circuit to the third landing push $7^3$. It will be obvious that the same arrangement can be applied to the control of a lift serving any number of landings, each of the landing pushes being connected up so that it closes its own control circuit and opens those of all pushes above it, thus preventing interference between the car push and the landing pushes, if three or more pushes are actuated simultaneously. It is also clear that the pushes may be so connected, if required, that each push opens the circuits of all those below it.

Figure 3:
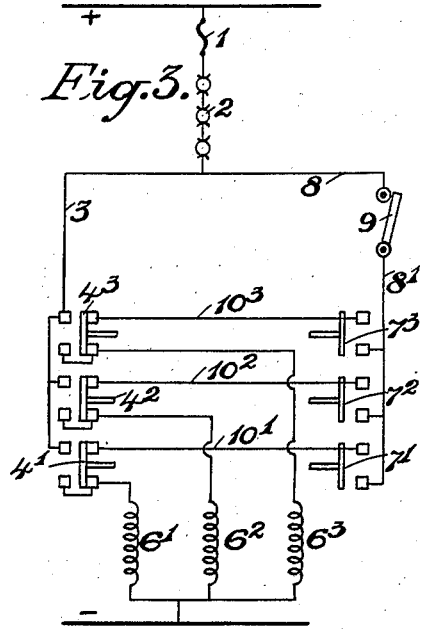

In another arrangement, see Figure 3, the landing pushes 7 are of simple type but each car push 4 is of the make-and-break type having four contacts, the control circuit being led by the common line 3 to a normally open contact of each car push-button; the other normally open contact (shown on the left) of each car-push is connected by way of one of the normally closed contacts (on the right) to the respective floor magnet 6. The other normally closed contact of each car-push 4 is connected by a lead 10 to a normally open contact of the corresponding landing push 7 the other normally open contact of which is connected to the common line 8 from the non-interference switch 9. In this case each push button in the car controls the corresponding landing push, so that the latter is rendered inoperative while the car-push is pressed; no interference can therefore be produced, because the undesired co-operation of two landing pushes, as in Figure 1, is prevented by the automatic disconnection of the lead 10 corresponding to the car-push 4 which is being actuated.

The make-and-break pushes employed for example at the points $7^1$ $7^2$ in Figure 2, and at the points $4^1$ $4^2$ $4^3$ in Figure 3, may be of any suitable construction, the preferred form being illustrated in Figures 4, 5 and 6, in which the contacts are enclosed in a box 11 of flanged cylindrical shape adapted to be let into the support 12 upon the car or landing. An insulating base 13 is fitted to the mouth of the box and held by a soft rubber ring 14 which is compressed by the cover 15 when the latter is secured for example by the screws 16. The push button 17 is mounted slidably in the centre of the base, and is normally pressed outwards by a spring 18, so as to maintain the bevelled edge of the contact disc 19, which is carried by a stem 20 screwed into the button 17, in engagement with a pair of diametrically opposite contact fingers 21. A second pair of diametrically opposite contact fingers 22, spaced at ninety degrees in relation to the fingers 21 and of greater length than the latter, are adapted to be engaged by the other edge of the disc 19 when the button 13 is pressed inwards of the box. The contact fingers 21, 22 are secured to binding posts 23, mounted upon the base plate 13 and provided with screws 24 or other means for the attachment of the electrical leads.

Referring to Figure 7, the elevator is assumed by way of example to be operated by a single speed direct current hoisting motor M, receiving current from the positive and negative mains + and —, which also supply the controlling mechanism comprising the safety devices 2, car pushes 4, landing pushes 7, floor magnets 6, floor controller Q, and reversing magnets U and D operating the reversing switches in the motor circuit. The controlling circuit also includes the car floor switch 9, push-control car-holding magnets 25, 26, emergency stop-push 27, car-gate contact 28, and interlock and non-interference contacts 29 on the reversers. The motor circuit includes the blow-outs 30, reversing switch contacts 31, 32, 33, stopping resistance 34, hold-down magnet coils 35 on the reverser, motor armature M, and accelerating switch 36, with starting resistance 37 and series field winding 38. The brake magnet coil B, the shunt field winding S, and the accelerating magnet A are energized by current from the auxiliary contacts 39 and 40 on the reversing switch.

With the exception of the landing pushes 7, the above parts are all of well-known type and their operation need not be explained in detail.

Let it be assumed that the car is standing at the second floor landing, and that a passenger in the car wishing to proceed to the fourth floor closes the gates and presses the corresponding push $4^4$. By the closing of the landing gates or doors, a circuit will first be closed from the positive main, by the lead 41, through the usual switches, fuses and landing gate locks 2, across the lower contacts of the car floor switch 9, depressed by the weight of the passenger, thence by lead 42, through the push-control car holding magnets 25, 26, by lead 43 to the negative main. The energization of the magnet windings 25, 26, will raise their movable contact members 44, 45 from the positions shown in Figure 7 to abut against their upper fixed contacts.

The actuation of the car-push $4^4$ will now establish a circuit from the positive main through landing gate locks 2 as before, across the normally closed emergency stop push 27, through the closed car gate contact 28, by lead 46, to the fixed lower right hand contact of the electromagnetic switch 25, by lead 47, through the closed non-interference contacts 29 on the reverser, by lead 48, switch member 45 and lead 49, to the pressed push button $4^4$, thence by lead 50 to the fourth floor magnet $6^4$, (which now attracts its core to close the contacts 51, thus establishing a shunt path from 28 to $6^4$) across the bridged contacts 52 on the floor controller, by lead 53, through the up-winding U of the reverser, and by the usual interlock contacts, fuse and switches to the negative main. The operation of the up-reversing magnet will cause the motor M to start the car in the upward direction, until upon arrival at the fourth floor landing, the circuit will be interrupted by the floor controller Q, thus bringing the car to rest.

If now while the car is occupied, any one of the landing pushes 7 is pressed, no action will follow because the car floor switch 9 has disconnected the common lead 8 to the landing pushes in the usual way. But if two or more of the landing pushes 7, for example the pushes $7^1$ and $7^4$, are pressed simultaneously with the pressing of the car push $4^4$ as before which with single push buttons of the ordinary type would close a circuit from the car push $4^4$ through the landing pushes $7^4$ and $7^1$ to the floor magnet $6^1$ and the down-reverser D, thus bringing the up and down reversing magnets into operation simultaneously, any such interference is prevented by the present invention. This is due to the fact that the operation of any one of the landing pushes disconnects all those beyond it in a pre-determined order of position; for example in the arrangement shown, the operation of the push $7^1$ will leave its upper right hand contact isolated, thus cutting off current to the remaining pushes $7^2$, $7^3$, $7^4$, even if the car floor switch is in the upper position. Consequently when the car is being called by means of the pushes 7, the lower of two or more landing pushes will be given the preference; naturally the pushes may be arranged in the contrary manner, with the interconnections reversed end-for-end, if it be desired to give the preference to the upper of two simultaneous landing-calls. In either event, when two landing pushes are pressed at the same time as a car-push, as in the case just mentioned, the two landing pushes will be disconnected from one another and the difficulty arising from the establishment of two conflicting circuits as described and shown in Figure 1 will be entirely prevented.

It will be understod that the invention is not limited to the particular arrangements described, and that it may be applied to other systems of push-button operation and to the remote control of apparatus other than electrically-operated lifts.

Having thus described my invention, what I claim is:—

1. In an electrical control system comprising individual series of interconnected push-buttons, said series of push-buttons being arranged in parallel branches of the controlling circuit, the combination of a plurality of make-and-break push-buttons in one series, respectively connected to corresponding push-buttons in the other series, said make-and-break push-buttons being so arranged as to open one set of their contacts before closing the other set.

2. In an electrical control system comprising individual sets of interconnected push-buttons, said sets of push-buttons being arranged in parallel branches of the controlling circuit and having their corresponding push-buttons connected together, a make-and-break push-button included in one set, and alternative contacts controlled by said make-and-break push-button, one of said alternative contacts being connected to a normally open contact of another push-button in the same set and the other of said alternative contacts being connected to a normally open contact of a corresponding push-button in another set.

3. In an electrical control system comprising individual series of interconnected push-buttons, said series of push-buttons being arranged in parallel branches of the controlling circuit, and corresponding push-buttons of the respective series having common connections to the controlled apparatus, the combination of a plurality of make-and-break push-buttons in one series, each of said make-and-break push-buttons interrupting the interconnection of the push-buttons of that series before closing a connection to the controlled apparatus.

4. In an electrical control system comprising individual series of interconnected push-buttons, said series of push-buttons being arranged in parallel branches of the controlling circuit, and corresponding push-buttons of the respective series being connected together, the combination of a plurality of make-and-break push-buttons in one series, each of said make-and-break push-buttons interrupting the connection to the corresponding push-button of the other series before closing its own connection to the controlled apparatus.

5. In an elevator control system, comprising a series of floor-pushes in the elevator car and a series of call-pushes at the respective landings, a plurality of two-way pushes included in one of said series, each of said two-way pushes interrupting a normally completed common line to certain other pushes before completing its own branch of the controlling circuit.

6. In an elevator control system, comprising a series of floor-pushes in the elevator car and a series of call-pushes at the respective landings, a plurality of make-and-break pushes included in one of said series, each of said make-and-break pushes opening a normally closed common line to certain other pushes before closing its own branch of the controlling circuit.

7. In an elevator control system, comprising a set of floor-pushes in the elevator car and another set of call-pushes at the respective landings, a make-and-break push included in one set, and alternative contacts controlled by said make-and-break push, one of said alternative contacts being connected to a normally open contact of another push in the same set, and the other of said alternative contacts being connected to a normally open contact of the corresponding push in the other set.

8. In an elevator control system, comprising a set of floor-pushes in the car and another set of pushes at the respective landings, the combination of a plurality of make-and-break pushes in the landing set, each of said make-and-break pushes interrupting its connection to all landing pushes beyond it in a pre-determined order before closing a connection to the controlled apparatus.

9. In an elevator control system, comprising a set of interconnected pushes in the car and a set of interconnected pushes at the respective landings, corresponding pushes of the two sets being connected together, a plurality of make-and-break pushes included in one set, each of said make-and-break pushes interrupting the connection to the corresponding push of the other set before closing its own connection to the controlled apparatus.

In testimony whereof I have signed my name to this specification.

EDWARD CLEMENCE.